United States Patent
Scagliola et al.

(10) Patent No.: US 8,765,201 B2
(45) Date of Patent: Jul. 1, 2014

(54) HIGH CALORIE FOOD PRODUCT AND METHOD

(75) Inventors: Sheri Scagliola, Palm Beach Gardens, FL (US); Michelle Perillo, Marlborough, CT (US)

(73) Assignee: Creneau Creations, Inc., Palm Beach Gardens, FL (US)

( * ) Notice: Subject to any disclaimer, the term of this patent is extended or adjusted under 35 U.S.C. 154(b) by 0 days.

(21) Appl. No.: 13/155,938

(22) Filed: Jun. 8, 2011

(65) Prior Publication Data

US 2012/0315352 A1 Dec. 13, 2012

(51) Int. Cl.
*A23L 1/30* (2006.01)

(52) U.S. Cl.
USPC ......................................................... 426/72

(58) Field of Classification Search
None
See application file for complete search history.

(56) References Cited

U.S. PATENT DOCUMENTS

| | | | | |
|---|---|---|---|---|
| 4,156,020 | A * | 5/1979 | Bohrmann et al. | 426/96 |
| 6,036,984 | A * | 3/2000 | Sartorio et al. | 426/72 |
| 6,346,284 | B1 * | 2/2002 | Briend et al. | 426/93 |
| 7,008,654 | B1 * | 3/2006 | Fuchs et al. | 426/72 |
| 2004/0175485 | A1 * | 9/2004 | Kramer | 426/632 |
| 2007/0042021 | A1 * | 2/2007 | Schiffrin et al. | 424/439 |
| 2007/0116802 | A1 * | 5/2007 | Germano | 426/72 |
| 2009/0238893 | A1 * | 9/2009 | Langford et al. | 424/602 |

FOREIGN PATENT DOCUMENTS

| | | | |
|---|---|---|---|
| DE | 3503505 A1 | * | 8/1986 |
| GB | 2412834 A | * | 10/2005 |

OTHER PUBLICATIONS

Cleveland Clinic. Nutrition Problems and Their Solutions. Aug. 2008. [Online]. Downloaded from <URL: http://web.archive.org/web/20080827100912/http:/my.clevelandclinic.org/healthy_living/Nutrition/hic_Nutrition_Problems_and_Their_Solutions.aspx> 7 pages.*

Fellows, PJ. Part I. Basic Principles; 1.5.1 Effect of aw on Foods. In: Food processing technology—Principles and practice, 2nd ed. 2000. Woodhead Publishing. pp. 44-45.*

Howard, BM; Hung, Y-C; McWatters, SK. Analysis of Ingredient Functionality and Formulation Optimization of an Instant Peanut Beverage Mix. 2010. J Food Sci. 75(1):S8-S19. Article first published online Nov. 9, 2009.*

Crowley, R. Measuring Viscosity. 2006. [Online]. Downloaded from <URL:http://www.foodproductdesign.com/articles/2006/07/measuring-viscosity.aspx>.*

* cited by examiner

*Primary Examiner* — Humera Sheikh
*Assistant Examiner* — Subbalakshmi Prakash
(74) *Attorney, Agent, or Firm* — McHale & Slavin, P.A.

(57) ABSTRACT

A food product high in calories from fat and carbohydrate is provided. The fat is incorporated in powder for later mixing with an aqueous medium to form a viscous liquid that is stable against phase separation of the oil and water. The product also includes protein and preferably at least one of vitamins and minerals. The food product has a low water activity and is packaged in a sealed container.

9 Claims, 1 Drawing Sheet

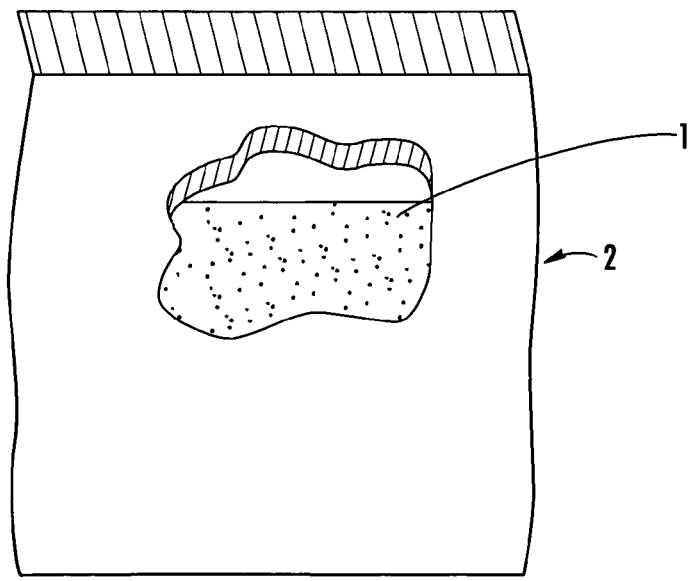

HIGH CALORIE FOOD PRODUCT AND METHOD

FIELD OF INVENTION

The present invention relates to a food product that provides a finished food product that is high in calories for a given volume or weight. The food product is easily transported and can be made consumable easily at any location.

BACKGROUND OF THE INVENTION

Some people have difficulty consuming enough calories to gain weight. This may be caused by such disorders as fear of eating, dysphagia, lack of appetite, depression, renal failure, medication and many other causes. In the case of dysphagia, a person has difficulty in swallowing and becomes dehydrated and short of nutrition, including calories. Poor diet habits, including consumption of so-called empty calories, can also be a cause of malnutrition. Malnutrition can cause many problems, including lack of physical and mental development, secondary health issues like susceptibility to disease and even death.

In some cases, malnutrition is difficult to treat because many nutritious products require the consumption of a large quantity by weight or volume to obtain the needed calories. Some of the more concentrated sources of calories are fat and sugars (saccharides). However, these are considered empty calories even though they have nutritional benefits. They are also often difficult to incorporate into other food products that have desirable organoleptic properties. For example, fat can be difficult to incorporate into a water based product since they do not mix without other ingredients or harsh processing. Fat is also prone to oxidize, resulting in poor organoleptic properties. But, fat can be considered as essential to the diet because it can carry fat soluble food components like some vitamins. However, the consumption of fat and sugar alone can be difficult for many people, and beside calories, provide little overall nutritional benefit.

The ability to find high calorie nutritious food is difficult in a calorie conscious society where the emphasis is on low calorie food to manage against weight gain. Custom made food can be done, but usually involves foods high in water and hence weight and volume. As mentioned, the incorporation of fat into high water foods can be difficult, particularly for home preparation. Preparation from fresh foods like fruit can be difficult since many fresh foods require refrigeration for storage and comminution for preparation as by blending, with a power blender, resulting in inconvenience to the consumer and limited location choices for preparation. It is preferred to consume the food as a liquid since ingestion is easier for most people; so blending of some foods, like a banana, may not be acceptable because of its blended viscosity.

There is thus a need for a high calorie nutritious food product that can be easily stored and transported, that can be prepared easily by the addition of a liquid, and that is stable during its life before and during consumption. It is also desirable to provide a finished product that can be consumed both cold and at room temperature without significant organoleptic property change and that can be stored refrigerated after being made a liquid.

SUMMARY

The present invention involves the provision of a food product comprising a blend of fat incorporated into powder having a particle size of less than about 3000 microns, protein in powder form having a particle size of less than about 3000 microns, at least one carbohydrate, and at least one of a vitamin and mineral. The blend has a calorie content of at least about 4 calories per gram on a dry weight basis and a water activity of less than about 0.7.

The present invention also involves the provision of a method of making a liquid mixture of water and a food blend. The food blend includes fat incorporated into powder having a particle size of less than about 3000 microns, protein in powder form having a particle size of less than about 3000 microns, at least one carbohydrate, and at least one of a vitamin and mineral. The blend has a calorie content of at least about 4 calories per gram on a dry weight basis and a water activity of less than about 0.7 prior to mixing with water. The mixture has a viscosity of at least about 3500 cp at room temperature and a calorie content of at least about 1.7 calories per gram of mixture. The mixture is consumed by a human.

BRIEF DESCRIPTION OF THE DRAWINGS

FIG. 1 illustrates a packaged food product of the present invention with portions broken away to show an interior portion.

Like numbers used throughout this application represent like or similar parts and/or construction.

DETAILED DESCRIPTION OF THE INVENTION

While the present invention is susceptible of embodiment in various forms, there are hereinafter described presently preferred embodiments with the understanding that the present disclosure is to be considered an exemplification of the invention and is not intended to limit the invention to the specific embodiments described.

The food product of the present invention contains several ingredients to achieve a high calorie concentrated blend that can be readily mixed with water to form a liquid drink. Preferably, some of the ingredients are from natural foods that are powdered (comminuted to small particle size). The blend 1 as packaged in sealed package 2 has a water activity level ($A_w$) less than about 0.7 and preferably less than about 0.4 for the bulk of the combined ingredients. The calorie content of the blend is preferably greater than about 4, more preferably greater than about 4.5, and most preferably greater than about 5 cal/gram of blend on a dry weight basis of the blend.

To achieve the caloric value, two preferred ingredients are fat and sugar (saccharide). However, the incorporation of fat into water can be difficult without the use of industrial equipment and/or emulsifiers and other chemicals. The fat is preferably incorporated into a powder. The fat is preferably sourced from a plant seed such as peanuts, soybeans and the like. The fat can be provided as part of peanut flour that will also provide flavor and protein as described below. A preferred peanut flour contains about 28% oil (fat) on a dry weight basis. However, peanut flour has a wide range of fat content. Fat is present in the blend in an amount in the range of between about 20% and about 35%, preferably in the range of between about 25% and about 31%, and most preferably in the range of between about 27% and about 29% of blend on a dry weight basis. The calories provided by the fat are in the range of between about 1 cal/gr. and about 4 cal/gr., and preferably in the range of between about 2 cal/gr. and about 3 cal/gr. per gram of blend on a dry weight basis.

Protein in powder form is provided in the blend. One source can be the source of the oil, plant protein such as from peanuts or other oil containing seeds such as soy. Milk protein can also be used such as from whole milk powder. If the protein is readily soluble or dispersible in hydrated mixture as discussed below, it preferably has a particle size of less than about 3000 microns, more preferably less than about 2500 microns, and most preferably less than about 2400 microns. If the fat is combined in a powder such as peanut fat in peanut powder which can contain protein, and is not readily dispersible or the powder is not readily soluble, the powder preferably has a particle size of less than about 1000 microns, more preferably less than about 750, and most preferably less than about 500 microns. Protein is present in the blend in an amount of at least about 15%, preferably in the range of between about 15% and about 20%, and more preferably in the range of between about 17% and about 19% of blend on a dry weight basis.

The blend also includes at least one carbohydrate such as one or more sugars (saccharides). The preferred carbohydrate is one or more sugars such as fructose, sucrose, glucose and lactose. The carbohydrate can be added separately and/or come as part of other ingredients. The carbohydrate is present in the blend in an amount of at least about 5%, preferably in the range of between about 5% and about 10%, and more preferably in the range of between about 7% and about 9% by weight of blend on a dry weight basis. The calories provided by the carbohydrate are in the range of between 0.5 calories and 3 calories, and preferably in the range of between about 1.5 and 2.0 calories per gram of blend on a dry weight basis. If the carbohydrate is soluble, the size of the particles is not important but is preferably smaller than about 600 microns. If insoluble, the particle size is preferably in the range of between about 750 microns and 1300 microns, more preferably in the range of between about 750 microns and about 1200 microns, and most preferably in the range of between about 750 microns and about 850 microns.

The blend can also include at least one of vitamins and/or minerals. These components can be provided as separate components or come as constituents of other components, such as fruits described below. The amounts will vary as known in the art and can range from about 0.05% to about 0.1% by weight of the blend on a dry weight basis.

The blend can use whole milk powder and creamer to provide sources of protein, fat, and saccharide (e.g., sugar). The fat from these ingredients which is incorporated into the powder would be dairy fat, plant fat such as fat from seed oil. The creamer can contain a sugar such as corn syrup solids and other components such as silicon dioxide as an anti-caking agent. The milk powder can contain and provide milk protein, lactose and dairy fat. Both the milk powder and creamer are in powder form having particle size as described above for the peanut product.

The blend can also include fruit and/or vegetable components. Preferably fruit or vegetable is added in powder form after having been ground and is dry having an $A_w$ of less than about 0.5, and preferably less than about 0.3. The particle size is preferably in the range of between about 750 microns and 1300 microns, more preferably in the range of between about 800 microns and about 1250 microns, and most preferably in the range of between about 850 microns and about 1200 microns. It is to be understood, though, that larger particulates of fruit and other ingredients can be included if desired for organoleptic appeal. The fruit and/or vegetable component can provide flavor, fat (e.g., from banana), fiber, thickening, vitamins and minerals. It has been found that the use of fruit, like pear, can be used to mask off flavors from oxidized fat. Some of the fruits include pear, banana, strawberry, plum, and apple. Preferably, the blend has a fiber content above about 0.05 grams per gram of dry blend.

Other minor ingredients can be added such as salt, natural and artificial flavors as are known in the food art.

The blend 1 is packaged in a sealed package 2 as described above and is shelf stable, capable of being stored at room temperature. In a preferred embodiment, for a single serving package 2 of blend 1, it is preferred that the weight of the blend is in the range of between about 100 grams and about 150 grams on a dry weight basis. The material of package 2 has a low oxygen and moisture permeability. A suitable packaging material is foil lined and preferably opaque.

When it is desired to consume the blend, it is mixed with water such as water alone or water in a high water food such as milk. The blend can be mixed by hand, shaken in a closed container or blended in a blender providing convenience of preparation at any desired site of consumption such as at home, in a restaurant or the like. It has been found that many of the components of the blend will add viscosity to the hydrated mixture and help stabilize the high amount of fat against separation from the mixture in water. The product can be served at room temperature or can be cooled and stored in a refrigerator after preparation. The weight ratio of blend to water is preferably between about 1:1 and about 1:1.5. It is preferred that the blend be added to enough water to provide a hydrated mixture viscosity in the range of between about 3500 cp (centipoise) and about 6500 cp, preferably in the range of between about 4000 cp and about 5500 cp, and most preferably in the range of between about 4500 cp and about 5500 cp at room temperature.

It has been found that the dry ingredients can be hydrated and mixed in several ways providing for a range of viscosities, even though the ingredients and total water are the same. The blend and water can be mixed by hand resulting in lower viscosity, while mixing by shaking can provide an intermediate viscosity. Mixing with a blender can provide a higher viscosity. This provides the consumer with the ability to customize the final product without a formula change. Part of the viscosity is due to the fiber, and part is due to the protein. This can be important to people with dysphagia who can be sensitive to viscosity, some needing higher viscosity and some needing lower viscosity to facilitate swallowing.

The blend preferably has a total moisture content of less than about 5% and preferably less than about 2% by total weight of blend as packaged. The hydrated mixture preferably has a calorie content in the range of between about 50 calories/ounce (cal's/oz) (1.7 cal's/gr) and about 100 cal's/oz (3.5 cal's/gr), more preferably in the range of between about 60 cal's/oz (2.1 cal's/gr) and about 90 cal's/oz (3.2 cal's/gr), and most preferably in the range of between about 70 cal's/oz (2.5 cal's/gr) and about 80 cal's/oz (2.8 cal's/gr) of hydrated mixture.

It is also preferred that the hydrated blend provide a serving size in the range of between about 6 and about 12 fluid ounces by volume and provide about 500 to about 900 total calories.

The powders described above are such as to not form lumps upon mixing with water and are readily dispersible and/or soluble in water along with any incorporated fat which is dispersed in the mixture with water.

It is to be understood that while a certain form of the invention is described and shown, it is not to be limited to the specific form or arrangement herein described. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A food product in powder form comprising a blend of:
   powder having a particle size of less than about 3000 microns;
   fat incorporated into said powder, said fat is present in an amount of at least about 20% by weight of blend on a dry weight basis wherein at least some of said fat is derived from a plant seed;
   protein in powder form having a particle size of less than about 3000 microns, said protein is present in an amount of at least about 15% by weight of blend on a dry weight basis wherein at least some of said protein is derived from a plant seed including peanuts;
   at least one carbohydrate, at least one said carbohydrate is a sugar, said carbohydrate is present in an amount of at least about 40% by weight of blend on a dry weight basis;
   at least one of a vitamin and mineral; and wherein
   the blend having a calorie content of at least about 4 calories per gram on a dry weight basis wherein the fat providing calories to the blend in the range of between about 1 and about 4 calories per gram of blend on a dry weight basis and the carbohydrate providing calories to the blend of at least about 0.5 calories per gram of blend on a dry weight basis, said blend having a water activity of less than about 0.7 and is contained in a package.

2. The food product of claim 1 including fruit, said fruit having a water activity of less than about 0.5.

3. The food product of claim 2 wherein the blend is present in a weight range of between about 100 grams and about 150 grams on a dry weight basis in the package.

4. The food product of claim 1 wherein the blend includes added water in an aqueous medium in a weight ratio of between about 1:1 and about 1:1.5 of blend per gram of water in the aqueous medium.

5. The food product of claim 4 wherein the blend and water mix has a viscosity in the range of between about 3500 cp and about 6500 cp at room temperature.

6. The food product of claim 1 wherein said powder including the protein and said fat is incorporated at least partially into said protein.

7. The food product of claim 1 wherein at least some of the fat and the protein powder is derived from peanuts.

8. A method of increasing weight in a human including:
   making a liquid mixture of water and food blend, the food blend including powder and fat incorporated into the powder, wherein at least some of said fat is derived from a plant seed, the powder having a particle size of less than about 3000 microns, protein in powder form, wherein at least some of said protein is derived from a plant seed including peanuts, at least one carbohydrate, at least one said carbohydrate is a sugar, at least one of a vitamin and mineral, and wherein the blend having a calorie content of at least about 4 calories per gram on a dry weight basis and a water activity of less than about 0.7 prior to mixing with water, said fat is present in the blend in an amount of at least about 20% by weight of blend on a dry weight basis, said protein is present in the blend an amount of at least about 15% by weight of blend on a dry weight basis, said carbohydrate is present in the blend in an amount of at least about 40% by weight of blend on a dry weight basis, the mixture having a viscosity of at least about 3500 cp at room temperature and a calorie content of at least about 1.7 calories per gram of mixture; and
   consuming the mixture.

9. The method of claim 8 wherein the mixture having a total serving size in the range of between about 6 and about 12 fluid ounces and a total calorie content in the range of between about 500 to about 900 calories.

* * * * *